(12) United States Patent
Yost

(10) Patent No.: US 7,290,142 B1
(45) Date of Patent: Oct. 30, 2007

(54) SYSTEM AND METHOD FOR INITIALIZING A SIMPLE NETWORK MANAGEMENT PROTOCOL (SNMP) AGENT

(75) Inventor: William Henry Yost, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 895 days.

(21) Appl. No.: 10/089,506

(22) PCT Filed: Sep. 22, 2000

(86) PCT No.: PCT/US00/26060

§ 371 (c)(1),
(2), (4) Date: Aug. 9, 2002

(87) PCT Pub. No.: WO01/24444

PCT Pub. Date: Apr. 5, 2001

Related U.S. Application Data

(60) Provisional application No. 60/156,385, filed on Sep. 28, 1999.

(51) Int. Cl.
*H04L 9/00* (2006.01)

(52) U.S. Cl. .......................... 713/171; 726/6; 713/184; 709/222

(58) Field of Classification Search .................. 380/28, 380/30, 44; 713/184, 193, 185, 171; 726/6
See application file for complete search history.

(56) References Cited

U.S. PATENT DOCUMENTS 6,044,468 A * 3/2000 Osmond ........................ 726/5
6,047,072 A * 4/2000 Field et al. .................. 380/283
6,067,621 A * 5/2000 Yu et al. ...................... 713/172

(Continued)

OTHER PUBLICATIONS

Cryptography and Network Security Principles and Practices, William Stallings, pp. 190-192, 454-457, Second Edition, Prentice Hall, 1998.*

(Continued)

*Primary Examiner*—Nasser Moazzami
*Assistant Examiner*—Shanto M Z Abedin
(74) *Attorney, Agent, or Firm*—Joseph J. Laks; Ronald H. Kurdyla; Guy H. Eriksen

(57) ABSTRACT

A system and method for initializing a SNMP agent in SNMPv3 mode. In one aspect of the invention, a method is provided that allows an operator to securely enter the initial SNMPv3 privacy and authentication keys into a SNMPv3 device and cause the device to enter in SNMPv3 mode. The SNMP manager and SNMP agent both generate an associated random number and public value. The SNMP manager passes its public value to the SNMP agent in a configuration file, which causes a proprietary MIB element in the SNMPv3 device to be set with the public value of the SNMP manager. The SNMP manager reads the public value of the SNMP agent through a SNMP request using an initial valid user having access to the public value of the SNMP agent. The SNMP agent and SNMP manager each independently compute a shared secret using the Diffie-Hellman key exchange protocol. The SNMP manager and SNMP agent each independently convert the shared secret into the same readable password, convert the readable password into the same secret key and set the initial authentication key and the initial privacy key to the value of the secret key.

7 Claims, 2 Drawing Sheets

U.S. PATENT DOCUMENTS

| | | | | |
|---|---|---|---|---|
| RE37,178 E | * | 5/2001 | Kingdon | 713/170 |
| 6,263,437 B1 | * | 7/2001 | Liao et al. | 713/169 |
| 6,292,790 B1 | * | 9/2001 | Krahn et al. | 705/50 |
| 6,539,479 B1 | * | 3/2003 | Wu | 713/151 |
| 6,757,825 B1 | * | 6/2004 | MacKenzie et al. | 713/171 |
| 7,047,408 B1 | * | 5/2006 | Boyko et al. | 713/169 |

OTHER PUBLICATIONS

Passwords—Strengths and Weaknesses, Gary C Kessler, pp. 1-8, Auerbach, 1997.*

SNMPv3: A Security Enhancement for SNMP, William Stallings, pp. 2-17, IEEE, 1998.*

SNMPv3: A security enhancement for SNMP, william stallings, IEEE, 1998.*

Diffie-Helman key change MIB, pp. 1-14, Michael C StJohns, Internet draft, 1998.*

Internet Security Architecture, Refik Molva, Computer networks, 1999.*

Key Derivation for Network Management Applications, pp. 26-29, Uri Blumenthal et al, IEEE, 1997.*

Key Derivation for Network Management Application, Uri Blumenthal et al, pp. 26-29, IEEE, 1997.*

O. Cherakaoui, N. Rico and A. Serhrouchni, "*SNMPv3 can still be simple?*", Proceedings of the Sixth IFIP/IEEE International Syposium on Integrated Network Management, May 24-29, 1999, pp. 501-515.

C. Wenli, J. Nitin and S. Singh, "*ANMP: Ad Hoc Network Management Protocol*", IEEE Journal Sel. Areas Commun. (USA), IEEE Journal on Selected Areas in Communications, Aug. 1, 1999, pp. 1506-1531.

R. Sellin, "*Fortsetzung einer Erfolgsstory. Architektur und Funktionalitaet von SNMP Version 3*", Net—Zeitschrift Fuer Komunikationalsmanagement, de, Huthig Verlag, Heilderberg, vol. 53, No. 5, 1999, pp. 56-61.

R. Grimm et al., "*Security policies in OSI-management experiences from the DeTeBerkom project BMSsec*", Computer Networks and ISDN Systems, NL, North Holland Publishing, Amsterdam, vol. 28, No. 4, Feb. 1, 1996, pp. 499-511.

\* cited by examiner

SYSTEM AND METHOD FOR INITIALIZING A SIMPLE NETWORK MANAGEMENT PROTOCOL (SNMP) AGENT

This application claims the benefit under 35 U.S.C. § 365 of International Application No. PCT/US00/26060, filed Sep. 22, 2000, which claims the benefit of U.S. Provisional Application 60/156,385, filed Sep. 28, 1999.

BACKGROUND

1. Technical Field

The present application relates generally to a system and method for initializing an SNMP (simple network management protocol) agent and, in particular, a system and method for generating authentication and privacy keys for a first user of a SNMPv3 network-managed device and securely entering the keys into the device to initialize the device into SNMPv3 mode.

2. Description of Related Art

In general, the SNMP is a standard application-layer protocol that is employed in a network to facilitate the exchange of management information between networked devices. The SNMPv3 framework defines standard security and access control protocols known, respectively, as the User-Based Security Model (USM) and View-Based Access Control Model (VACM). The SMMPv3 standard is an extensible "bare-bones" protocol that allows vendors to incorporate proprietary MIB (management information base) elements and applications to execute on top of the standard SNMP framework.

An SNMP network generally comprises a plurality of distributed SNMP entities each comprising one or more SNMP agents and one or more SNMP managers (although an entity may comprise both an agent and manager) that communicate using SNMP messages. An SNMP manager (or NMS (network management station)) is responsible for managing one or more SNMP agents within the domain of the SNMP manager. An SNMP agent is included on each node (or host) of the network (e.g., computer, server, etc) that is managed by an SNMP manager. Each agent is responsible for collecting and maintaining information about its environment and providing such information to a respective SNMP manager and responding to manager commands to alter the local configuration or operating parameters of the managed node. Each SNMP agent maintains a local MIB (management information base, which is a virtual information store that comprises management information, i.e., current and historical information about the local configuration and traffic of the managed device (node). More specifically, the SNMP agent MIB comprises a collection of managed objects within the device to be managed, wherein collections of related objects are defined in MIB modules.

In an SNMPv3 mode, an SNMP agent implements the standard USM (user-based security model), wherein the configuration parameters for the USM are managed via MIB elements defined by the SNMP-USER-BASED-SM-MIB module (which is described in detail, for example, in RFC 2574, "User-Based Security Model (USM) for version 3 of the Simple Network Management Protocol (SNMPv3)", by Blumenthal et al, April 1999). As is known in the art, for USM, all valid users associated with an SNMPv3 agent utilize a unique secret authentication key and unique privacy key (and standard protocols) for authentication incoming/outgoing messages and encrypting/decrypting the payload of outgoing/incoming messages. Furthermore, in an SNMPv3 mode, the SNMP agent utilizes the View-based Access Control Model (VACM) is utilized by the agent (in response to a call by an SNMP application) to determine whether a specific type of access (read, write) is authorized for a SNMP manager requesting to retrieve or modify local MIB managed data, or whether the manager is authorized to receive notifications (traps) from the agent. The configuration parameters for the VACM are managed via MIB elements defined by the SNMP-VIEW-BASED-ACM-MIB as described in detail, for example, in RFC 2575, "View-based Access Control Model (VACM) for the Simple Network Management Protocol (SNMP)", by Wijnen, et al, April, 1999).

Various applications and network architectures implement the SNMP framework. For instance, the SNMP protocol has been selected as the communications protocol for management of DOCSIS (Data Over Cable Service Interface Specifications)-based cable modem systems. The DOCSIS cable modems are configured with SNMP agents, which allows a manager (operator of the DOCSIS cable modem system) to remotely manage and configure the cable modems of the end users. The current DOCSIS cable modem system framework, however, does not provide a standard protocol for entering the initial authentication and privacy keys into a cable modem to initialize the cable modem in SNMP v3 mode and vendors must provide proprietary protocols for performing this initialization.

The SNMPv3 framework recommends that the usmUserTable be populated out of band, e.g., not using SNMP (i.e., the first user must be created and its authorization and privacy keys entered in the managed device without using SNMP). SNMP can not be used for this initialization because it provides privacy only by using the privacy key of an already existing user. If the number of agents to be initialized is small, an initialization process can be performed via a console port and manually. If the number of agents is large, such as in cable modem systems, the manual approach is burdensome and does not scale well. Accordingly, a system and method that would provide a secure method for entering the privacy and authentication keys into a cable modem in a DOCSIS system to initialize the modem in SNMPv3 mode is highly desirable.

SUMMARY OF THE INVENTION

The present invention is directed to a system and method for initializing a SNMP agent in SNMPv3 mode. In one aspect of the invention, a method is provided that allows an operator to securely enter the initial SNMPv3 privacy and authentication keys into a SNMPv3 device and cause the device to enter in SNMPv3 mode. The SNMP manager and SNMP agent both generate an associated random number and public value. The SNMP manager passes its public value to the SNMP agent in a configuration file, which causes a proprietary MIB element in the SNMPv3 device to be set with the public value of the SNMP manager. The SNMP manager reads the public value of the SNMP agent through a SNMP request using an initial valid user having access to the public value of the SNMP agent. The SNMP agent and SNMP manager each independently compute a shared secret using the Diffie-Hellman key exchange protocol. The SNMP manager and SNMP agent each independently convert the shared secret into the same readable password, convert the readable password into the same secret key, and then set the initial authentication key and the initial privacy key to the value of the secret key.

In another aspect of the present invention, the configuration file passes the CMTS Diffie-Hellman public value to the modem using a proprietary configuration file object type, wherein the proprietary configuration file object has the advantage of not causing SNMP v1/v2c capable only modems to reject the configuration file because they do not understand a standard SNMP MIB object (configuration file element type 11) that may be used to set a proprietary MIB element in the modem.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM, Flash memory, etc.) and executable by any device, machine or platform comprising suitable architecture. It is to be further understood that because some of the system components and method steps are preferably implemented in software, the actual connections may differ depending upon the manner in which the present invention is programmed.

Figure 1:
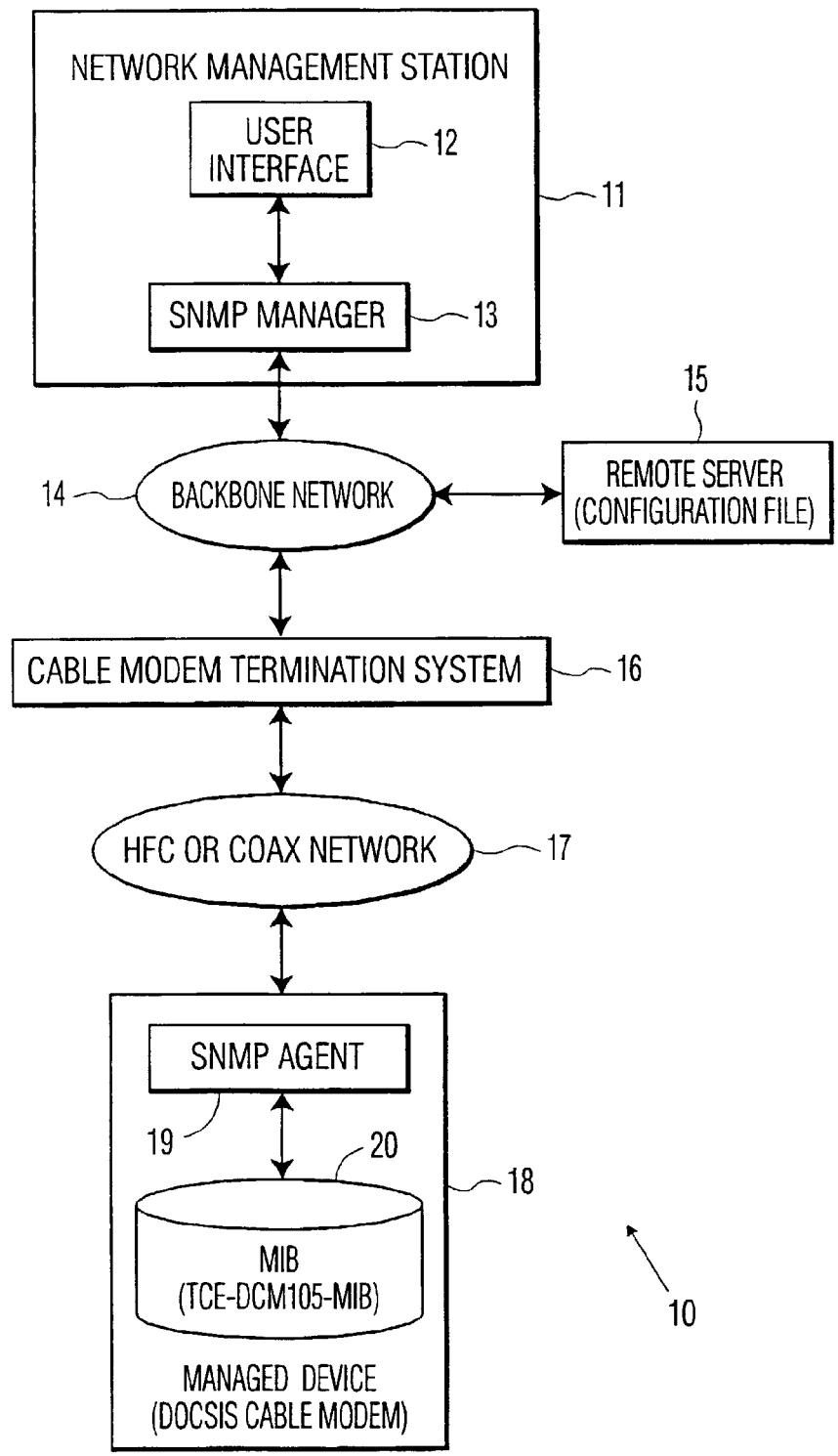
FIG. 1 is a block diagram of system for initializing a SNMPv3 agent according to an exemplary embodiment of the present invention.

Referring to FIG. 1, block diagram illustrates a system 10 for initializing a SNMPv3 managed device according to an exemplary embodiment of the present invention. More specifically, the system 10 comprises a DOCSIS cable modem system that provides transparent bi-directional transfer of Internet Protocol (IP) packets (received/transmitted over a backbone network 14, e.g., the Internet) between a CMTS (cable modem termination system) 16 and a SNMPv3 cable modem 18 over an all coaxial or hybrid-fiber/coaxial (HFC) cable network 17. As is known in the art, the CMTS 16 performs functions such as providing an interface between IP traffic and RF (radio frequency) modulation/transmission of the IP packets and assigning IP addresses to cable modem 18. It is to be understood that only one cable modem is shown for illustrative purposes, but the system 10 may comprise hundreds of cable modems.

The system 10 comprises a NMS (network management station) 11 located on the backbone network 14 for managing the CMTS 16 and DOCSIS cable modem 18. The NMS 11 comprises a user interface 12 (e.g., a GUI (graphic user interface)) and a SNMP manager 13 of conventional architecture for communicating with the SNMP agents 19 of cable modem 18 via SNMP messages. The system 10 further comprises a remote server facility 15 that is accessible by the cable modem 18 for, e.g., downloading a configuration file comprising parameters that are used for configuring the cable modem 18. For instance, as explained in detail below, the configuration file comprises objects that are used to initialize the SNMP agent 19 in SNMPv3 mode using a proprietary Diffie-Hellman Key exchange protocol for entering the initial authentication and privacy keys into the cable modem 18. In general, this protocol allows an operator at the NMS (manager) 11 to securely enter the initial SNMPv3 privacy and authentication keys into the modem 18 and cause the modem 18 to enter SNMPv3 mode using a Diffie-Hellman key exchange. The manager 13 provides its public value to the modem 18 via the configuration file (located, for example, in server 15). The manager 13 reads the public value of the modem 18 via SNMPv3 using a standard default usmUser which has access only to these values (and the standard 'system' group). Via the DH exchange, the manager 13 and the cable modem 18 can agree on a common shared secret which is used to populate the key values for another standard usmUser who has access to the usmUserTable to create and delete additional users. The manager 13 can then populate that table as necessary.

In accordance with the present invention, the cable modem 18 comprises an MIB that comprises proprietary MIB module and associated MIB elements for effecting a Diffie-Hellman key exchange. More specifically, the MIB 20 comprises a proprietary MIB module referred to herein as TCE-DCM105-MIB which defines MIB elements such as tceDCM105KickstartMyPublic and tceDCM105KickstartMgrPublic objects that are employed for an SNMPv3 initialization process. These MIB elements provide a mechanism for the SNMPv3 agent 19 (in the cable modem 18) and the SNMP manager 13 to perform a Diffie-Hellman key exchange to place the private keys for the first valid user into the cable modem 18. The tceDCM105KickstartMgrPublic object is set to the Diffie-Hellman public value of the manager 13 during a registration process. There are various mechanisms by which the public value of the manager 13 is transferred to the agent. Preferably, this transfer is performed via the configuration file (e.g., in remote server 15) that is downloaded by the cable modem 18 during the cable modem registration process. The value of the tceDCM105KickstartMyPublic MIB element comprises the Diffie-Hellman public value of the agent 19 that the agent 19 publishes for access by the manager 13 via SNMP after the registration process. Preferably, the manager 13 reads the content of tceDCM105KickstartMyPublic using an initial user having a securityName, e.g., "docsisInit", with no authentication. A preferred initialization process will now be described in further detail with reference to the flow diagram of FIG. 2.

Figure 2:
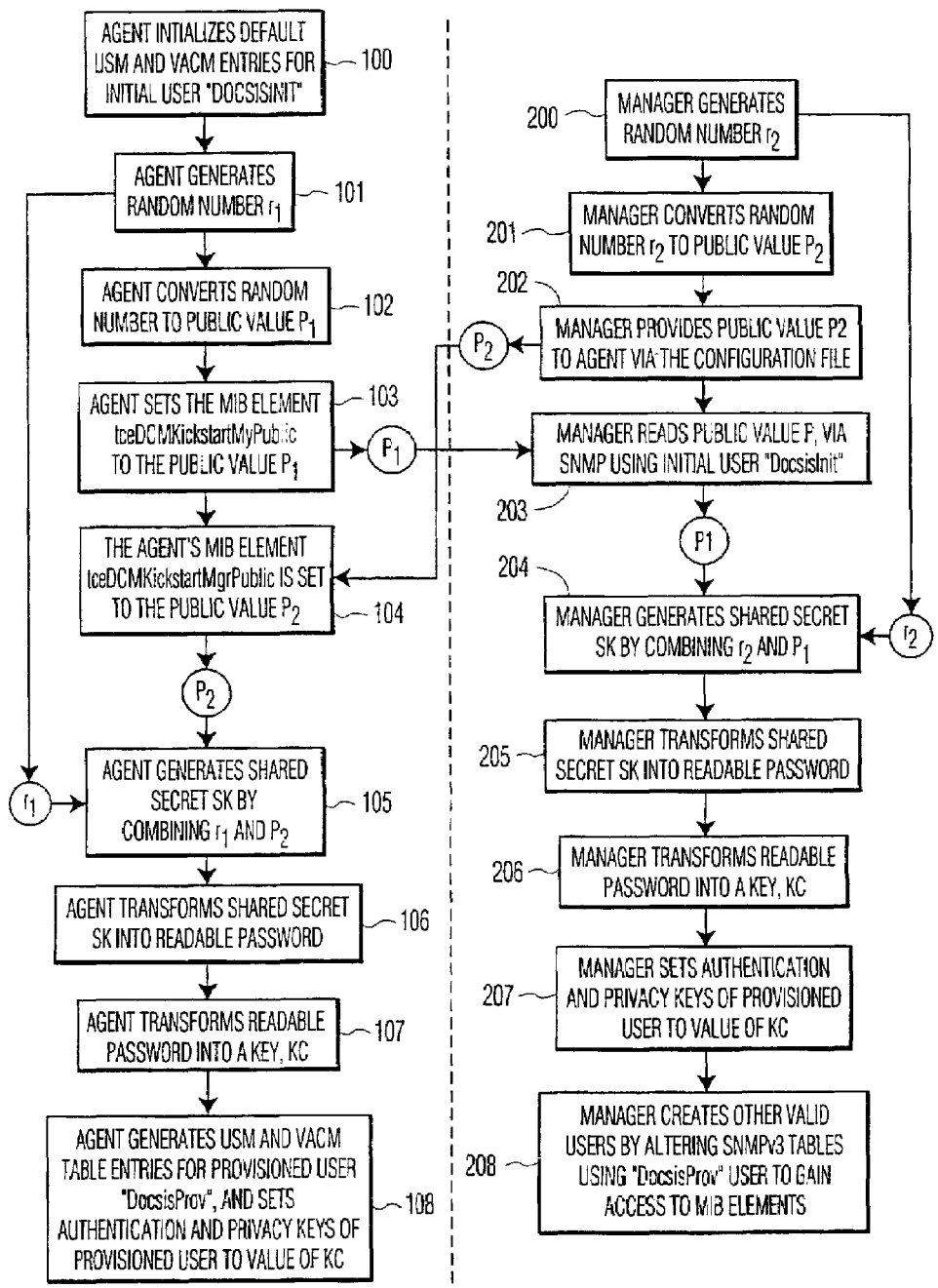
FIG. 2 is a flow diagram of a method for initializing a SNMPv3 agent according to one aspect of the present invention.

The flow diagram of FIG. 2 illustrates a method for initializing a SNMPv3 agent according to one aspect of the present invention. In FIG. 2, steps 100-108 represent steps that are executed by the SNMPv3 agent and steps 200-208 represent steps that are executed by the manager. Upon initialization/power up of the cable modem, proprietary software loaded in the cable modem causes the SNMP agent to create an SNMPv3 user named "docsisInit" of security level noAuthnoPriv and generate the appropriate USM and VACM entries (step 100). This initial valid user (which is used by the manager to access, e.g., the tceDCM105KickstartMyPublic MIB element of the modem) will only have read access to the tceDCM105Kickstart group, the system group, and the generic traps. Next, the agent generates a random number $r_1$ preferably up to 128 bytes in length (step 101). Then, using the well-known Diffie-Hellman protocol, the agent will convert its random number $r_1$ to a public value $P_1$ of the agent (step 102). More specifically, the agent's public value $P_1 = g^{r_1}$ Mod p, where g is the base from the set of Diffie-Hellman parameters, p is the prime from those parameters, and $r_1$ is the random integer selected by the agent in the interval $2^{(l-1)} \leq r_1 \leq p-1$, where l is the length of the private, random value $r_1$ in bits. The public value $P_1$ is expressed as an OCTET STRING "PV" of length "k" which satisfies $$y(integerpublicvalue) = \text{SUM}_{i=1}^{k} 2^{(8(k-i))} PV_i,$$

where $PV_1, \ldots, PV_k$ are the octets of PV from first to last, and where $PV_1 \ne 0$. In addition, the following Diffie-Hellman parameters (Oakley group #2, RFC 2409, sec. 6.1, 6.2) are preferably used:

g=2;
p=FFFFFFFF FFFFFFFF C90FDAA2 2168C234 C4C6628B 80DC1CD1 29024E08 8A67CC74 020BBEA6 3B139B22 514A0879 8E3404DD EF9519B3 CD3A431B 302B0A6D F25F1437 4FE1356D 6D51C245E485B576 625E7EC6 F44C42E9 A637ED6B 0BFF5CBB6 F406B7ED EE386BFB 5A899FA5 AE9F2411 7C4B1FE649286651 ECE65381 FFFFFFFF FFFFFFFF; and
l=64.

The agent publishes its public value $P_1$ in the MIB element tceDCM105KickstartMyPublic (step 103).

During a registration process, the SNMP manager will generate its random number $r_2$, which is preferably up to 128 bytes in length (step 200). The manager then transforms its random number $r_2$ to a public value $P_2$ using the Diffie-Hellman key exchange protocol (step 201) in the same manner as the agent and using the same parameter set as described above.

In the DOCSIS framework, during registration, as is known in the art, the cable modem attempts to establish network connectivity by, e.g., transmitting a DHCP (dynamic host configuration protocol) request to the CMTS to obtain an IP address and other parameters that are needed to establish IP connectivity. The CMTS will transmit a DHCP response comprising, e.g., the name and location, e.g., the IP address of a TFTP (trivial file transfer protocol) server (such as the remote server 15 in FIG. 1), of a configuration file that is accessible by the cable modem. Using the information in the DHCP response, the SNMPv3 cable modem will download the appropriate configuration file via TFTP.

In accordance with the present invention, the manager transfers its public value $P_2$ to the agent via the configuration file (step 202) (which is downloaded by the modem) in one of several ways. In the exemplary embodiment illustrated in FIG. 2, this is performed using an SNMP "Set" MIB Object in the configuration file (i.e., the DOCSIS standard configuration file element type 11) to set the tceDCM105KickstartMgrPublic MIB element (in the cable modem) to the public value $P_2$ of the manager (step 104). Other embodiments for transferring the public value $P_2$ of the manager to the cable modem are described below.

When the agent determines that the tceDCM105KickstartMgrPublic has been set to the manager's public value, the agent computes a shared secret SK from its random number $r_1$ and the manager's public value $P_2$ via the Diffie-Hellman key exchange protocol (step 105). More specifically, the SNMPv3 agent computes the shared secret $SK = P_2^{r_1} \bmod p$, where p is the DH prime from the preferred common parameters described above.

Next, in a preferred embodiment, the SNMPv3 agent converts the shared secret SK to privacy and authentication keys as follows. First, the agent transforms the shared secret SK into a readable password of preferably 16 characters (or fewer) (step 106). Preferably, this is performed by discarding any OCTETS (in the SK string) beyond the $16^{th}$ octet and then performing the following on each remaining octet:

a. if (octet>0x7F), then octet=octet B 0x80; //Clear the top bit
b. if (octet≦0x20) octet=octet+0x40; //Re-Map control codes
c. if (octet=0x7F) octet=octet−1; //Re-map delete character.

Advantageously, this process of generating a readable password allows an operator at the NMS to easily enter the password (as opposed to entering the shared secret octet string).

Second, the readable password is then translated into a 16 byte key, KC (step 107). Preferably, this step is performed using the algorithm described in Appendix A, section A.1, paragraph (2) of RFC 2574 "AUser-based Security Model (USM) for version 3 of the Simple Network Management Protocol". More specifically, a string of length 1,048,576 octets is generated by repeating the value of the password as often as necessary, truncating accordingly, and using the resulting string as the input to the MD5 algorithm (which is well-known in the art) to generate a digest (termed "digest 1"). Then, a second string is formed by concatenating digest 1, the SNMP engine's snmpEngineID value, and digest 1. This string is used as input to the MD5 algorithm. The resulting digest is the 16 byte key.

The SNMPv3 agent then generates an SNMPv3 user (provisioned user) referred to herein as "docsisProv" and generates appropriate USM and VACM table entries (as discussed in detail below) of security level AuthPriv with read/write access to the SNMPv3 tables, and then preferably sets both the privacy key and authentication key (of the provisioned user) to the value of the 16 byte key, KC (step 108). The agent will use this same 16 byte key, KC for any other users created in the SNMPv3 tables by the configuration file. This ends the modem registration process.

Upon completion of registration, the manager can confirm the modem has entered SNMPv3 mode by reading a non-zero length OCTET STRING (i.e., the agent's public value $P_1$) from the tceDCM105KickstartMyPublic MIB element (step 203). The manager will read this value using the initial user "docsisInit" (security level noAuthNoPriv) via an SNMP "Get" command. The manager will use its random number $r_2$ and the agent's public value $P_1$ (i.e., the tceDCM105KickstartMyPublic value) to compute the shared secret SK (via the Diffie-Hellman key exchange algorithm) (step 204). This is the same shared secret SK computed by the agent. Next, the manager computes the same readable password for the "docsisProv" user from the shared secret SK (step 205), and then transforms the readable password to the value of KC (step 206) using the same process as the agent (described above in steps 106-107). The manager will then set the authentication and privacy keys for the provisioned user to the value of KC (step 207). It is to be appreciated that the Diffie-Hellman key exchange ensures that both the agent and the manager compute the same 16 character password without revealing it. It is to be appreciated that the security of this approach is directly related to the strength of the authorization security of the out of band provisioning of the manager's public value $P_2$.

The manager may then create other SNMPv3 users by altering the SNMPv3 tables (i.e., accessing the SNMP-USER-BASED-SM-MIB and SNMP-VIEW-BASED-ACM-MIB) using the "docsisProv" user and the password for both authentication and privacy in the AuthPriv security level (step 208).

The following are exemplary entries that are generated in the SNMv3 USM and VACM tables for initializing a DOC- SIS cable modem in SNMPv3 mode. More specifically, the following exemplary entries (1-4a, b, c) are preferably pre-installed and initialized in the DOCSIS SNMPv3 compliant modem upon power-up:

(1) This entry (usmUserEntry) in the usmUserTable allows access to the system and tceDCM105Kickstart groups. This entry allows the SNMP manager to read the modem's Diffie-Hellman public value (which is published by the agent in the tceDCMKickstartMyPublic MIB element) after registration has completed:

| | |
|---|---|
| usmUserEngineID | localEngineID |
| usmUserName | "docsisInit" |
| usmUserSecurityName | "docsisInit" |
| usmUserCloneFrom | ZeroDotZero |
| usmUserAuthProtocol | none |
| usmUserAuthKeyChange | " " |
| usmUserOwnAuthKeyChange | " " |
| usmUserPrivProtocol | none |
| usmUserPrivKeyChange | " " |
| usmUserOwnPrivKeyChange | " " |
| usmUserPublic | " " |
| usmUserStorageType | permanent |
| usmUserStatus | active |

(2) An entry (vacmSecurityToGroupEntry) is generated in the vacmSecurityToGroupTable to map the initial user "docsisInit" into the accessible objects (i.e., this entry generates a groupName for the initial user "docsisInit." which is used to define an access control policy for the initial user):

| | |
|---|---|
| vacmSecurityModel | 3 (USM) |
| vacmSecurityName | "docsisInit" |
| vacmGroupName | "docsisInit" |
| vacmSecurityToGroupStorageType | permanent |
| vacmSecurityToGroupStatus | active. |

(3) An entry (vacmAccessEntry) is generated in the vacmAccessTable translates the groupName for the initial user into appropriate view name (i.e., this entry defines the access rights for the initial user "docsisInit"):

| | |
|---|---|
| vacmGroupName | "docsisInit" |
| vacmAccessContextPrefix | " " |
| vacmAccessSecurityModel | 3 (USM) |
| vacmAccessSecurityLevel | noAuthNoPriv |
| vacmAccessContextMatch | exact |
| vacmAccessReadViewName | "docsisInitRestricted" |
| vacmAccessWriteViewName | " " |
| vacmAccessNotifyViewName | "docsisInitRestricted" |
| vacmAccessStorageType | permanent |
| vacmAccessStatus | active |

The above entry in the vacmAccessTable is used for unauthenticated access, i.e., read-notify access for securityModel USM, securityLevel "noAuthNoPriv" on behalf of securityName (i.e., user "docsisInit") that belongs to the group "docsisInit" to the "docsisInitRestricted" MIB view in the default context with contextName"".

(4) The following three entries (vacmViewTreeFamilyEntry) are generated in the vacmViewTreeFamilyTable to allow the initial entry to access the system, kickstart groups, and generic traps:

| | | |
|---|---|---|
| (a) | vacmViewTreeFamilyViewName | "docsisInitRestricted" |
| | vacmViewTreeFamilySubtree | 1.3.6.1.2.1.1 (system) |
| | vacmViewTreeFamilyMask | " " |
| | vacmViewTreeFamilyType | 1 (included) |
| | vacmViewTreeFamilyStorageType | permanent |
| | vacmViewTreeFamilyStatus | active |
| (b) | vacmViewTreeFamilyViewName | "docsisInitRestricted" |
| | vacmViewTreeFamilySubtree | (tceDCM105KickstartGroup) |
| | vacmViewTreeFamilyMask | " " |
| | vacmViewTreeFamilyType | 1 (included) |
| | vacmViewTreeFamilyStorageType | permanent |
| | vacmViewTreeFamilyStatus | active |
| (c) | vacmViewTreeFamilyViewName | "docsisInitRestricted" |
| | vacmViewTreeFamilySubtree | 1.3.6.1.6.3.1.1.5 (snmpTraps) |
| | vacmViewTreeFamilyMask | " " |
| | vacmViewTreeFamilyType | 1 |
| | vacmViewTreeFamilyStorageType | permanent |
| | vacmViewTreeFamilyStatus | active |

The following entries (5-8a, b, c, d) are created in the SNMPv3 compliant modem when the Diffie-Hellman key exchange is completed.

(5) The following entry in the usmUserTable is associated with the provisioned user that is created with the authentication and privacy keys set by the DH key exchange. This entry is preferably created when the modem is correctly provisioned via entry of the manager's public value in the modem via the configuration file as explained above (step 202. 104 of FIG. 2). It is to be noted that the userName "docsisProv" gives at least full access to the usmUserTable for the created of additional valid user: and is preferably generated with the Authentication and privacy keys set by the DH Key exchange:

| | |
|---|---|
| usmUserEngineID | localEngineID |
| usmUserName | "docsisProv" |
| usmUserSecurityName | "docsisProv" |
| usmUserCloneFrom | ZeroDotZero |
| usmUserAuthProtocol | usmHMACMD5AuthProtocol |
| usmUserAuthKeyChange | " " |
| usmUserOwnAuthKeyChange | " " |
| usmUserPrivProtocol | usmDESPrivProtocol |
| usmUserPrivKeyChange | " " |
| usmUserOwnPrivKeyChange | " " |
| usmUserPublic | " " |
| usmUserStorageType | permanent |
| usmUserStatus | active |

(6) The next entry maps the provisioned user "docsisProv" into the accessible objects:

| | |
|---|---|
| vacmSecurityModel | 3 (USM) |
| vacmSecurityName | "docsisProv" |
| vacmGroupName | "docsisProv" |
| vacmSecurityToGroupStorageType | permanent |
| vacmSecurityToGroupStatus | active |

(7) The next entry translates the groupName for the provisioned user to a view name: user.

| | |
|---|---|
| vacmGroupName | "docsisProv" |
| vacmAccessContextPrefix | " " |
| vacmAccessSecurityModel | 3 (USM) |
| vacmAccessSecurityLevel | AuthPriv |

-continued

| | | |
|---|---|---|
| | vacmAccessContextMatch | exact |
| | vacmAccessReadViewName | "docsisProv" |
| | vacmAccessWriteViewName | "docsisProv" |
| | vacmAccessNotifyViewName | "docsisProv" |
| | vacmAccessStorageType | permanent |
| | vacmAccessStatus | active |

(8) The following four entries allow the provisioned user read-write access to the system, tceDCM105Kickstart, usmMIBObjects, and vacmMIBObjects groups:

| | | |
|---|---|---|
| (a) | vacmViewTreeFamilyViewName | "docsisProv" |
| | vacmViewTreeFamilySubtree | 1.3.6.1.2.1.1 (system) |
| | vacmViewTreeFamilyMask | " " |
| | vacmViewTreeFamilyType | 1 |
| | vacmViewTreeFamilyStorageType | permanent |
| | vacmViewTreeFamilyStatus | active |
| (b) | vacmViewTreeFamilyViewName | "docsisProv" |
| | vacmViewTreeFamilySubtree | 1.6.3.1.6.3.15.1 (usmMIBObjects) |
| | vacmViewTreeFamilyMask | " " |
| | vacmViewTreeFamilyType | 1 |
| | vacmViewTreeFamilyStorageType | permanent |
| | vacmViewTreeFamilyStatus | active |
| (c) | vacmViewTreeFamilyViewName | "docsisProv" |
| | vacmViewTreeFamilySubtree | 1.6.3.1.6.3.16.1 (vacmMIBObjects) |
| | vacmViewTreeFamilyMask | " " |
| | vacmViewTreeFamilyType | 1 |
| | vacmViewTreeFamilyStorageType | permanent |
| | vacmViewTreeFamilyStatus | active |
| (4) | vacmViewTreeFamilyViewName | "docsisProv" |
| | vacmViewTreeFamilySubtree | (tceDCM105KickstartGroup)\ |
| | vacmViewTreeFamilyMask | " " |
| | vacmViewTreeFamilyType | 1 |
| | vacmViewTreeFamilyStorageType | permanent |
| | vacmViewTreeFamilyStatus | active |

In alternative embodiments of the present invention, other methods may be used to enter the manager's Diffie-Hellman public value into the modem and put it into SNMPv3 mode using proprietary configuration file elements (other than using an SNMP MIB object (configuration file element type 11) to set the tceDCM105KickstartMgrPublic MIB element as discussed above). These proprietary elements are particularly useful to initialize an SNMPv3 compliant modem in a SNMP network that has only SNMPv1/v2c modems which are not able to process a configuration file containing SNMP sets to the tceDCM105KickstartMgrPublic element and, consequently, cause the SNMPv1/v2c modems to reject the configuration file. For instance, the following configuration file elements may be used:

(1) tceKickStartMgrPublic (element 180)—This element comprises an octet string up to 128 bytes long with the manager's public value: and (2) tceKickStartMgrPublic2 (element 181)—This configuration file also comprises the managers public value. But in addition to putting the modem into SNMPv3 mode, it will cause the modem to translate the contents of a docsDevNmAccessTable (which is used for controlling access in SNMPv1/v2c) to corresponding entries in the SNMPv3 User, group, access, and view tables. More specifically, for each entry in the docsDevNmAccessTable, a user and view is created with a userName set to the value in the community string and an access table entry that requires noAuthNoPriv security level. Also, entries are made in the SNMPv3 NOTIFICATION-MIB to cause traps to be sent to any trap receivers designated in the docsDevNmAccessTable. By using this configuration file element (181), the modem will be put in SNMPv3 mode and still be accessible by SNMPv2 managers. Details of this configuration file element and the associated translation process are described in the PCT patent application "System and Method For Simple Network Management Protocol (SNMP) v3 Modems to Interoperate with SNMPv1/v2c Modems," filed concurrently herewith.

In another embodiment, the public values $P_1$ and $P_2$ of the agent and manager may be exchanged using DHCP. For instance, the agent may include its public value in the DHCP request that is transmitted to the CMTS during the initialization process (as described above) and the manager's public value may be transmitted to the cable modem in the associated DHCP response. In particular, the following DHCP proprietary element tceDHCPKickstartMgrPublic (182) may be included in the DHCP response.

The invention claimed is:

1. A method for initializing a SNMP (simple network management protocol) v3 device using an SNMP agent in the SNMPv3 device and an SNMP manager remote from the SNMPv3 device, comprising:
   utilizing a Diffie-Hellman key exchange protocol by the SNMP manager and the SNMP agent to enter an initial privacy key and an initial authentication key into the SNMPv3 device,
   wherein said utilizing step includes:
      generating an associated random number and public value by both the SNMP manager and the SNMP agent;
      passing the public value of the SNMP manager to the SNMP agent in a configuration file;
      reading, by the SNMP manager, the public value of the SNMP agent through a SNMP request using an initial valid user having access to the public value of the SNMP agent;
      computing a shared secret, by the SNMP agent and the SNMP manager, using the Diffie-Hellman key exchange protocol;
      converting the shared secret into a readable password;
      converting the readable password into a secret key; and
      setting the initial authentication key and the initial privacy key to the value of the secret key,
      wherein each of said converting steps are independently performed by both the SNMP agent and the SNMP manager.

2. The method of claim 1, wherein the readable password comprises a 16 character password.

3. The method of claim 1, wherein the secret key comprises a 16 byte string.

4. The method of claim 1, further characterized in that the configuration file comprises a proprietary configuration file element for passing the public value of the SNMP manager to the SNMP agent.

5. The method of claim 4, wherein the SNMPv3 device operates in a SNMPv1/v2c enabled network comprising a SNMPv2c device, and wherein the proprietary configuration file element is ignored by the SNMPv2c device.

6. The method of claim 1, wherein the public value of the SNMP manager is included in a management information base (MIB) object in the configuration file.

7. The method of claim 1, wherein the public value of the SNMP manager is initially stored in a third entity different from that associated with the SNMP manager and the SNMP agent, and the method comprises downloading the configuration from the third entity by the SNMP agent.

* * * * *